United States Patent
Ihara et al.

(10) Patent No.: US 8,643,453 B2
(45) Date of Patent: Feb. 4, 2014

(54) CYLINDRICAL BONDED MAGNET, METHOD FOR PRODUCING A CYLINDRICAL BONDED MAGNET, AND ROD-SHAPED MAGNET DEVICE

(75) Inventors: Kohei Ihara, Anan (JP); Michiya Kume, Anan (JP); Muneo Yamamoto, Anan (JP)

(73) Assignee: Nichia Corporation, Anan-shi (JP)

(*) Notice: Subject to any disclaimer, the term of this patent is extended or adjusted under 35 U.S.C. 154(b) by 0 days.

(21) Appl. No.: 13/132,317

(22) PCT Filed: Dec. 3, 2009

(86) PCT No.: PCT/JP2009/006605
§ 371 (c)(1),
(2), (4) Date: Jun. 1, 2011

(87) PCT Pub. No.: WO2010/067553
PCT Pub. Date: Jun. 17, 2010

(65) Prior Publication Data
US 2011/0241811 A1    Oct. 6, 2011

(30) Foreign Application Priority Data

Dec. 8, 2008 (JP) ................................. 2008-312049
Jul. 22, 2009 (JP) ................................. 2009-170665

(51) Int. Cl.
   *H01F 7/02*       (2006.01)
   *H01F 7/00*       (2006.01)
   *H02K 21/00*      (2006.01)

(52) U.S. Cl.
USPC ............ 335/306; 335/296; 335/302; 310/152

(58) Field of Classification Search
USPC ............... 335/229, 296, 302, 306; 310/49.28, 310/49.32, 49.53, 152, 154.04, 154.21, 310/154.32, 156.01
See application file for complete search history.

(56) References Cited

U.S. PATENT DOCUMENTS

| | | | | |
|---|---|---|---|---|
| 2,983,840 | A | * | 5/1961 | Van Iperen ...................... 315/3.5 |
| 3,034,651 | A | * | 5/1962 | Morrell .......................... 210/222 |
| 3,153,177 | A | * | 10/1964 | McFadyen ..................... 335/285 |
| 3,206,655 | A | * | 9/1965 | Reijnst ........................... 335/295 |
| 4,689,163 | A | * | 8/1987 | Yamashita et al. ......... 252/62.54 |
| RE34,443 | E | * | 11/1993 | Takahashi et al. ....... 324/207.21 |

(Continued)

FOREIGN PATENT DOCUMENTS

| | | |
|---|---|---|
| JP | 63-228707 | 9/1988 |
| JP | 06-349630 | 12/1994 |

(Continued)

OTHER PUBLICATIONS

International Search Report in PCT/JP2009/006605 dated Mar. 9, 2010.

(Continued)

*Primary Examiner* — Mohamad Musleh
(74) *Attorney, Agent, or Firm* — Foley & Lardner LLP (57) ABSTRACT

A cylindrical bonded magnet is provided which is multipolar-magnetized in the axial direction and can be produced with high productivity. The cylindrical bonded magnet includes magnetic powder and resin. The cylindrical bond magnet is an integrally formed member. The cylindrical bond magnet is magnetized so that a plurality of N and S poles are alternately provided in the axial direction. In the cylindrical bonded magnet, a totally even number of at least four N and S poles are alternately provided. The surface magnetic flux density distribution has a substantially sinusoidal wave with the both ends of the sinusoidal wave corresponding to nodes when the surface magnetic flux of the cylindrical bonded magnet is measured as viewed from the side surface of the cylindrical bond magnet along the axial direction.

8 Claims, 9 Drawing Sheets

(56) References Cited

U.S. PATENT DOCUMENTS

| | | | |
|---|---|---|---|
| 5,682,670 A * | 11/1997 | Bell et al. | 29/609 |
| 5,684,352 A * | 11/1997 | Mita et al. | 310/156.56 |
| 6,160,465 A * | 12/2000 | Yamaguchi et al. | 336/110 |
| 6,486,576 B1 * | 11/2002 | Yura et al. | 310/49.24 |
| 2003/0160674 A1 * | 8/2003 | Komuro et al. | 335/302 |
| 2006/0139137 A1 * | 6/2006 | Honkura et al. | 335/302 |
| 2009/0146507 A1 | 6/2009 | Teramachi et al. | |

FOREIGN PATENT DOCUMENTS

| | | |
|---|---|---|
| JP | 08-130862 | 5/1996 |
| JP | 09-191633 | 7/1997 |
| JP | 2001-231245 | 8/2001 |
| JP | 2003-303714 | 10/2003 |
| JP | 2004-320827 | 11/2004 |
| JP | 2005-073466 | 3/2005 |
| JP | 2008-182873 | 8/2008 |
| WO | WO-2006/106697 A1 | 10/2006 |

OTHER PUBLICATIONS

Decision to Grant a Patent Japanese Patent Application No. Toku-Gan No. 2009-170665 dated Oct. 15, 2010.

Notification of Reasons for Refusal Japanese Patent Application No. Toku-Gan No. 2009-170665 dated Jun. 28, 2010.

* cited by examiner

CYLINDRICAL BONDED MAGNET, METHOD FOR PRODUCING A CYLINDRICAL BONDED MAGNET, AND ROD-SHAPED MAGNET DEVICE

BACKGROUND OF THE INVENTION

1. Technical Field

The present invention relates to a cylindrical multipolar magnetized bonded magnet with N and S poles being alternately provided in the axial direction.

2. Description of Related Art

In various fields, cylindrical magnets are used having a plurality of permanent magnet members that are arranged with their same poles being opposed to each other. For example, they are used in a foreign matter removal device for removing iron powder and the like from food, and a stator for linear motors (Patent Documents 1, 2, 3 etc.). In the thus-constructed cylindrical magnet, for example, as for the N pole, since the N poles of the magnet members are opposed to each other, the magnetic flux extending from each N pole starts extending in a direction perpendicular to the axial direction of the cylindrical magnet and then curves in a large arc toward the S pole adjacent to this N pole. Accordingly, the magnetic field can be effectively formed outside of the cylindrical magnet. As a result, in the case of a foreign matter removal device, it is possible to improve the foreign matter catching performance. In the case of a linear motor, it is possible to provide strong propulsion force.

PATENT DOCUMENTS

Patent Document 1: Japanese Patent Laid-Open Publication No. JP 2003-303714 A

Patent Document 2: Japanese Patent Laid-Open Publication No. JP 2008-182873 A

Patent Document 3: Japanese Patent Laid-Open Publication No. JP 2005-73466 A

In Patent Document 1, after a plurality of magnet members are inserted into a case, the magnet members are fixed by welding sealing members to the both ends of the case. In Patent Document 2, each of a plurality of magnet members are fixed by an adhesive and are enclosed by a case formed of a nonmagnetic material. In these methods, in the process where the magnet is assembled, it is necessary to oppose the same poles of the magnets members. For this reason, the magnet members repel each other, which makes the assembling process dangerous and reduce the assembling workability. In addition, it is necessary to hold the magnet members by using a holding tool until the adhesive hardens. For this reason, the productivity is low.

Contrary to this, in the stator disclosed in Patent Document 3, which includes doughnut-shaped magnet members inserted into a support shaft, since the cylindrical magnet members are fixed by engaging groove portions formed in a support shaft with protruding portions formed on the doughnut-shaped magnet members, it is not necessary to use an adhesive. Accordingly, the stator can be safely assembled. However, since it is necessary to assemble the stator by hand, the productivity is also low. In addition, since the cavity is formed in the center of the doughnut-shaped magnet, its magnetic force is reduced.

The present invention is aimed at solving the problems. It is an object of the present invention to provide a cylindrical multipolar bonded magnet with a desired magnetic polarity pattern that can be produced with increased productivity without reducing magnetic properties.

SUMMARY OF THE INVENTION

The inventors of the present invention have diligently studied to solve the above problem, and as a result developed the present invention.

A cylindrical bonded magnet according to an aspect of the present invention includes magnetic powder and resin. The cylindrical bonded magnet is an integrally formed member. The cylindrical bonded magnet is magnetized so that a plurality of N and S poles are alternately provided in the axial direction. Here, the axial direction refers to a direction parallel to the axis of the cylindrical bonded magnet.

In the cylindrical bonded magnet according to another aspect of the present invention, a totally even number of at least four N and S poles are alternately provided. The surface magnetic flux density distribution has a substantially sinusoidal wave with the both ends of the sinusoidal wave corresponding to nodes when the surface magnetic flux of the cylindrical bonded magnet is measured as viewed from the side surface of the cylindrical bonded magnet along the axial direction.

A rod-shaped magnet device according to another aspect of the present invention includes at least two the aforementioned cylindrical bonded magnets, and a nonmagnetic pipe that accommodates the at least two cylindrical bonded magnets. The surface magnetic flux density distribution has a continuous substantially sinusoidal wave when the surface magnetic flux of the cylindrical bonded magnet is measured as viewed from the side surface of the nonmagnetic pipe along the axial direction.

In addition, the aforementioned cylindrical bonded magnet is preferably formed by injection molding.

In addition, it is preferable that the magnetic powder be anisotropic alloy powder of rare earth-iron-nitrogen group material.

A cylindrical bonded magnet production method according to still another aspect of the present invention is a method for producing a cylindrical bonded magnet of integrally formed member that includes magnetic powder and resin and is magnetized so that a plurality of N and S poles are alternately provided in the axial direction of the cylindrical bonded magnet. The method includes preparing a compound of the magnetic powder and the resin by kneading the magnetic powder and the resin, and forming the compound into the cylindrical bonded magnet with applying an orientated magnetic field to the compound. The orientated magnetic field is provided by a magnetically-orientating magnet device including a plurality of magnets that are combined with their same poles being opposed to each other. The magnetically-orientating magnet device is arranged enclosing the cylindrical bonded magnet.

Since a cylindrical multipolar bonded magnet according to the present invention is an integrally formed member having N and S poles that are alternately magnetized in the axial direction, it is possible to produce the cylindrical multipolar bonded magnet with high productivity.

DETAILED DESCRIPTION OF THE EMBODIMENT(S)

Preferred embodiments according to the present invention will be described with reference to the drawings. It should be appreciated, however, that the embodiments described below are illustrations of a cylindrical bonded magnet and a method for producing the cylindrical bonded magnet to give a concrete form to technical ideas of the invention, and a cylindrical bonded magnet and a method for producing the cylindrical bonded magnet of the invention are not specifically limited to description below.

Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown larger exaggeratingly for ease of explanation. Members same as or similar to those of this invention are attached with the same designation and the same reference numerals and their description is omitted. In addition, a plurality of structural elements of the present invention may be configured as a single part that serves the purpose of a plurality of elements, on the other hand, a single structural element may be configured as a plurality of parts that serve the purpose of a single element.

First Embodiment

A cylindrical bonded magnet according to a first embodiment of the present invention is now described. However, the cylindrical bonded magnet according to this embodiment is merely illustrative of the invention. The present invention is not limited to this embodiment.

Figure 1:
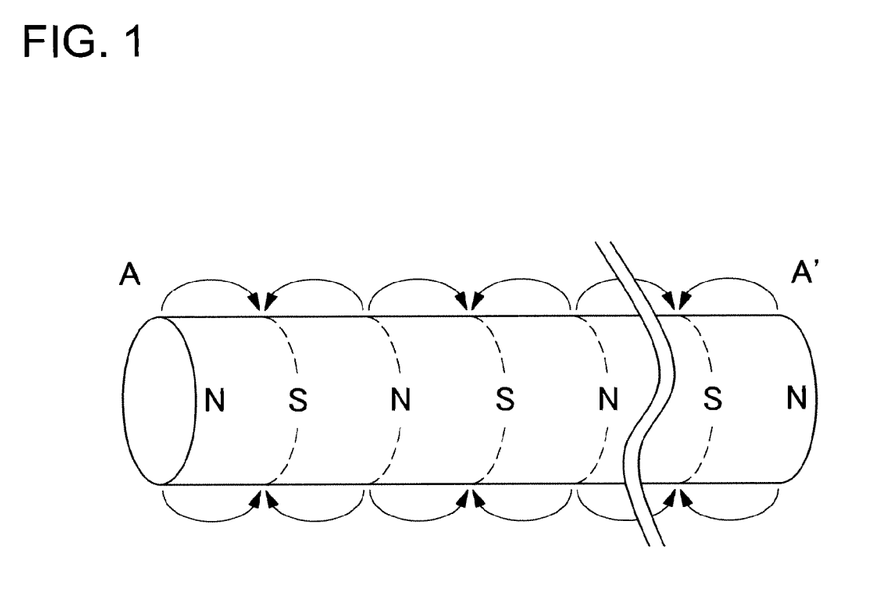
FIG. 1 is a schematic perspective view showing a cylindrical bonded magnet according to an embodiment of the present invention.

FIG. 1 is a schematic perspective view showing the cylindrical bonded magnet according to this embodiment. The cylindrical bonded magnet according to this embodiment is produced by the later-discussed injection molding machine. The cylindrical bonded magnet can be produced in a single molding process. That is, a cavity of the injection molding machine filled with a compound, resin in the compound is then hardened, and finally the cylindrical bonded magnet of integrally formed member is removed from the cavity. Thus, the cylindrical bond magnet according to the present invention can be an integrally formed member. Accordingly, dissimilar to the conventional method, the process is not required for assembling magnet pieces repelling each other piece by piece. Dissimilar to a magnet member constructed of a plurality of magnet pieces joined by an adhesion and a tubular magnet constructed of a bent sheet magnet with the end surfaces being joined to each other, the cylindrical bonded magnet according to the present invention does not have such a joined surface or adhesive surface. Although the cylindrical bonded magnet according to this embodiment is an integrally formed member, this cylindrical bonded magnet can efficiently provide magnetic force from the side surface of the cylindrical magnet similar to the conventional magnet having a plurality of magnetic poles with their same poles being opposed to each other. For this reason, the cylindrical bonded magnet according to this embodiment can be suitably used in foreign matter removal devices, linear motors and the like that require magnetic force provided from the side surface of magnets.

Figure 2:
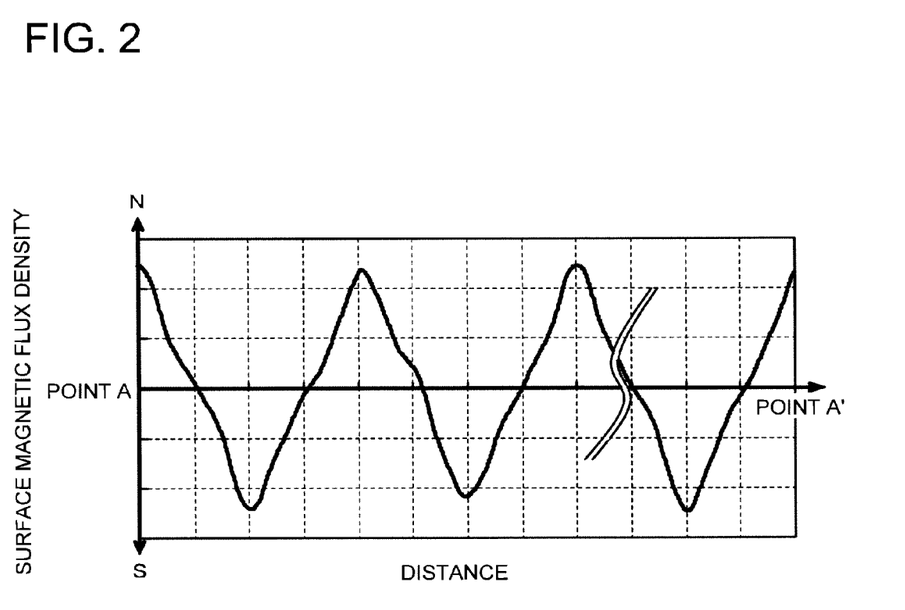
FIG. 2 is a graph showing the magnetic flux density distribution property of the cylindrical bonded magnet shown in FIG. 1 in the axial direction (A-A') as viewed from the side surface.

FIG. 2 is a graph showing the magnetic flux density distribution property of the cylindrical bonded magnet shown in FIG. 1 in the axial direction (A-A') as viewed from the side surface of the cylindrical bonded magnet. This magnetic flux density distribution property is measured in a cylindrical bonded magnet produced in the latter-discussed example. Since the cylindrical bonded magnet according to the present invention is magnetized so that a plurality of N and S poles are alternately provided (multipolar-magnetized) in the axial direction, this cylindrical bonded magnet has magnetic flux density distribution of sinusoidal curve when the magnetic flux density of this cylindrical bonded magnet is measured along the line A-A'. Although the magnetic flux density distribution along the line A-A' is illustratively shown, the magnetic flux density distribution along any axial line is substantially the same as FIG. 2 as viewed from the side surface. This means that the cylindrical bonded magnet according to the present invention is multipolar-magnetized. The distribution and the strength of the magnetic flux density of the cylindrical bonded magnet according to the present invention can be obtained by the arrangement of a magnetically-orientating magnet device that is used in the later-discussed injection molding.

Figure 3:
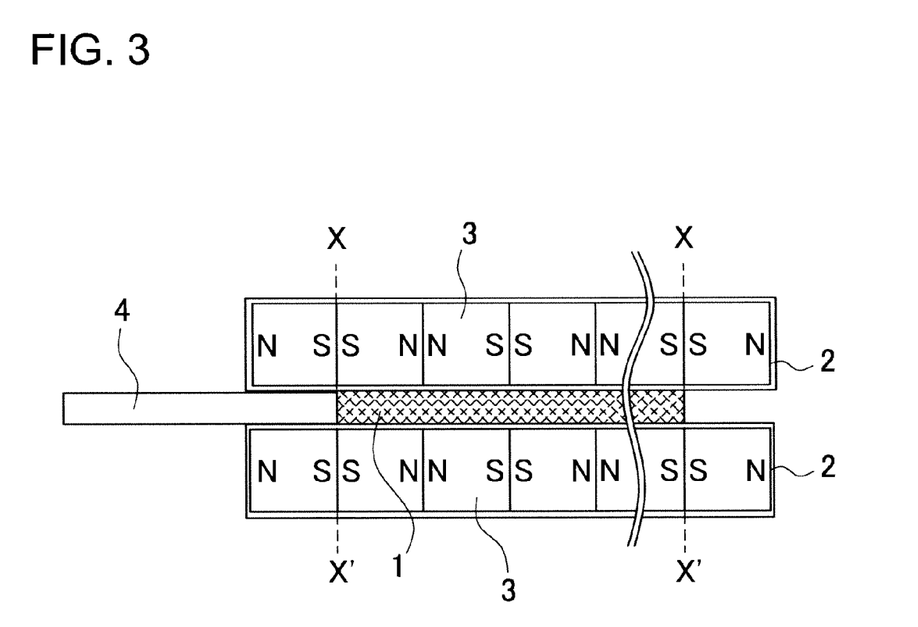
FIG. 3 is a schematic cross-sectional view showing a forming machine for forming a cylindrical bonded magnet according to an embodiment of the present invention.

FIG. 3 is a cross-sectional view showing the internal construction of the injection molding machine. The cylindrical bonded magnet according to this embodiment is produced by the injection molding machine. In a single molding process, a cavity of the injection molding machine filled with a melted compound, resin in the compound is then hardened, and finally the cylindrical bonded magnet of integrally formed member is removed from the cavity. The injection molding machine includes a cavity portion 1 as a mold for forming the integrally formed member, the magnetically-orientating magnet device 3 arranged enclosing the cavity portion 1, a side wall 2, and an ejector pin 4. The side wall 2 accommodates the magnetically-orientating magnet device 3. The interior wall part of the side wall is arranged between the cavity portion 1 and the magnetically-orientating magnet device 3. The ejector pin 4 is used to push the integrally formed member out of the injection molding machine after the integrally formed member is hardened. The magnetically-orientating magnet device 3 serves to orientate a magnetic powder included in the melted compound of the shape with which the cavity portion 1 is filled. Since the magnetically-orientating magnet device 3 encloses the cavity portion 1, the entire side surface of the thus-formed cylindrical bonded magnet is multipolar-magnetized. Also, since the magnetically-orientating magnet device 3 extends to the ends of the integrally formed member to be formed in the cavity portion 1, the surface magnetic flux density strength (peak top) values are substantially the same in all of the magnetic poles of the cylindrical bonded magnet.

Figure 4:
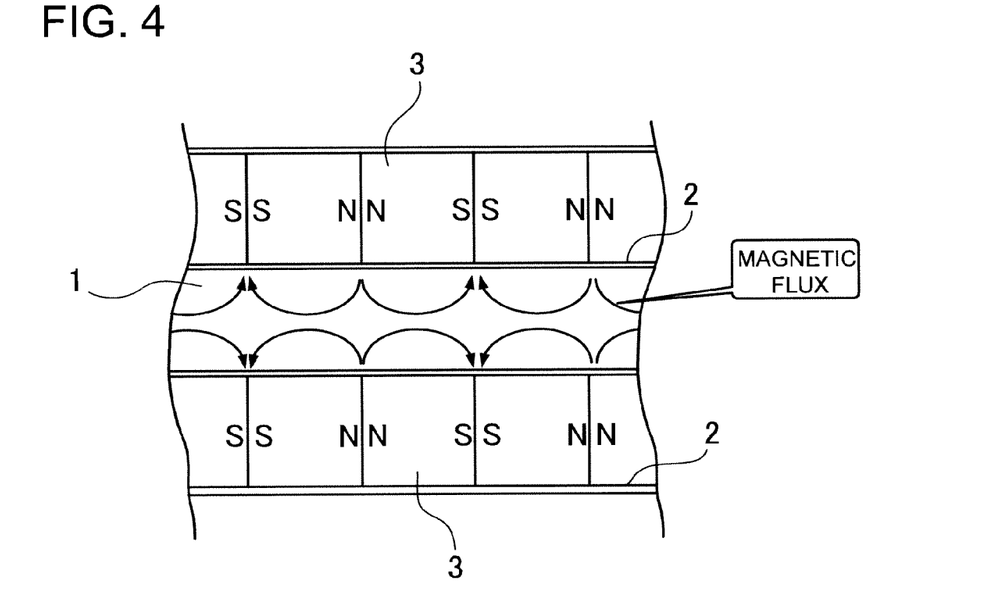
FIG. 4 is a schematic cross-sectional view illustrating the magnetic flux generated in a cavity of the forming machine forming the cylindrical bonded magnet according to the embodiment of the present invention.

FIG. 4 is a schematic cross-sectional view illustrating the magnetic flux generated in the cavity portion 1 by the magnetically-orientating magnet device 3. The magnetic flux as shown in FIG. 4 orientates the magnetic powder in the compound with which the cavity portion 1 is filled. Thus, as shown in FIG. 1, the magnetic flux is generated from the surface of the cylindrical bonded magnet after the cylindrical bonded magnet is removed from the cavity portion.

Figure 5:
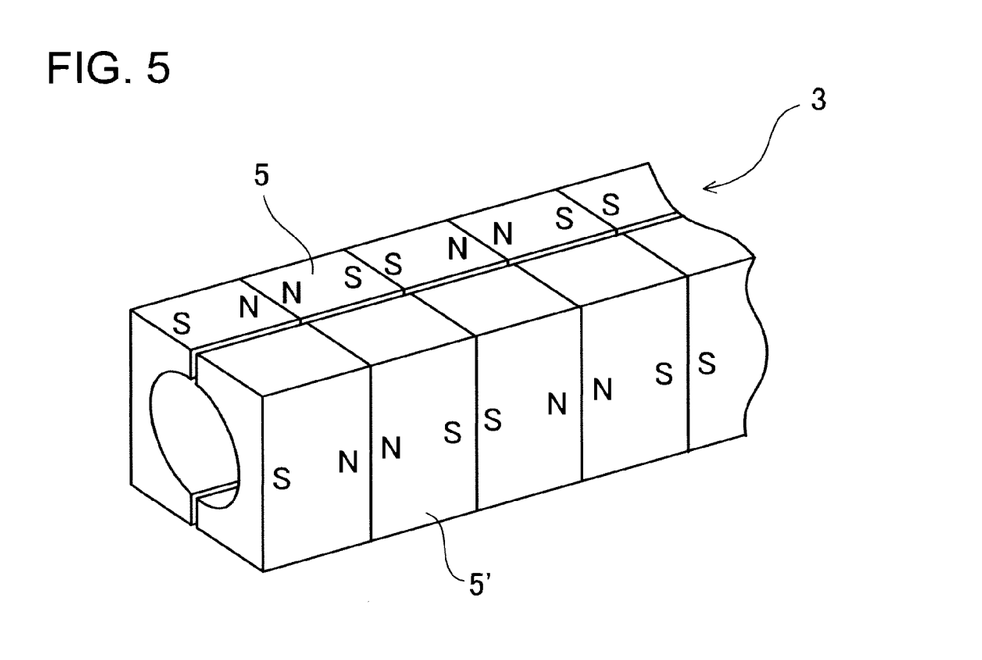
FIG. 5 is a perspective view showing a magnetically-orientating magnet device for forming a cylindrical bonded magnet according to the embodiment of the present invention.

FIG. 5 is a schematic perspective view showing the construction of the magnetically-orientating magnet device 3. The magnetically-orientating magnet device 3 is composed of a pair of magnet members 5 and 5'. Each of the magnet members 5 and 5' includes a plurality of U-shaped magnets with the same size that are fixed and aligned in axial direction with their same poles being opposed to each other. Each of the magnet members 5 and 5' is accommodated in the side wall 2. The magnet members 5 and 5' are arranged enclosing the cavity portion 1. Since the magnetically-orientating magnet device 3 is arranged enclosing the cavity portion 1, the entire side surface of the cylindrical bonded magnet can be multipolar-magnetized. The magnetically-orientating magnet device 3 is composed of a plurality of magnets. According to the present invention, this magnetically-orientating magnet device can produce the cylindrical bonded magnet having four or more poles. The orientation pitch of the thus-produced cylindrical bonded magnet corresponds to the width of the magnet used in the magnetically-orientating magnet device 3.

The orientation pitch of the cylindrical bonded magnet of the present invention preferably falls within a range of 1 to 30 mm in terms of practical use and ease of production. The orientation pitch refers to the distance between the positions of the N and S poles adjacent to each other in the maximum surface magnetic flux density. That is, the orientation pitch is the distance between magnetic poles. If the orientation pitch is smaller than 1 mm, the permanent magnetically-orientating magnets arranged in the mold are correspondingly required to have thickness thinner than 1 mm. In this case, machining or arrangement of the permanent magnetically-orientating magnets will be difficult. For this reason, orientation pitch smaller than 1 mm is not practical. In addition, in this case, the magnetic force from each magnetic pole will be small. On the other hand, if the orientation pitch is larger than 30 mm, the density of parts is reduced which generate strong magnetic force. Accordingly, the foreign matter attractive efficiency will be reduced. In addition, in the case of a linear motor, when the distance between magnetic poles is large, the linear movement precision is adversely affected. The cylindrical bonded magnet can be easily produced. Also, a cylindrical bonded magnet may be relatively easily produced by assembling magnet pieces. However, in the case where the orientation pitch is not larger than 30 mm, the integral molding process according to the present invention has a great advantage as compared with the method for producing a cylindrical bonded magnet by assembling magnet pieces. From this viewpoint, it is preferable that the orientation pitch be not larger than 30 mm. In addition, in the case where a cylindrical bonded magnet with three or more poles, the cylindrical bonded magnet can be more easily produced for a shorter time as compared with the method for producing a cylindrical bonded magnet by assembling magnet pieces.

Second Embodiment

Figure 8:
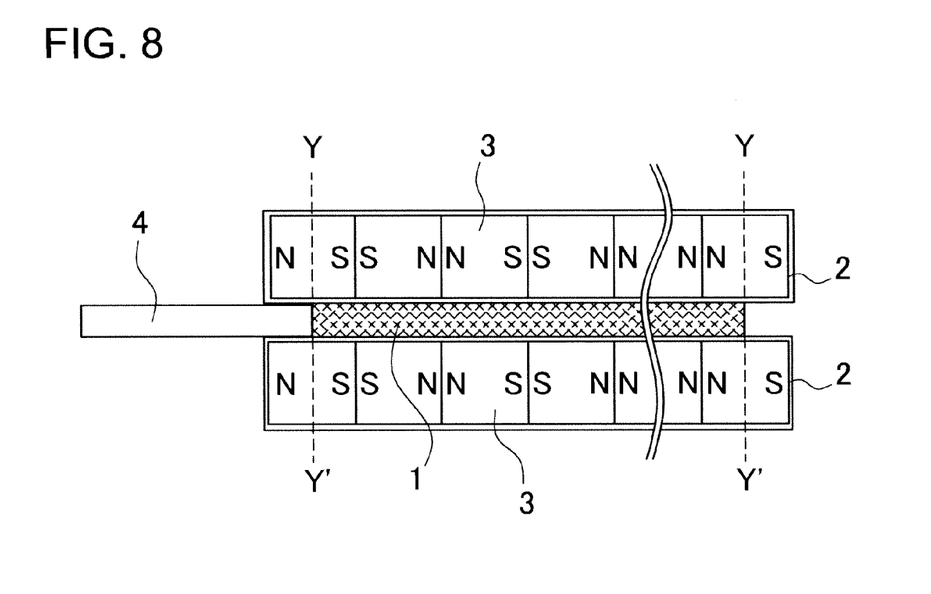
FIG. 8 is a schematic cross-sectional view showing the forming machine for forming a cylindrical bonded magnet according to the another embodiment of the present invention.

A cylindrical bonded magnet according to a second embodiment of to the present invention is now described. FIG. 8 is a cross-sectional view showing the internal construction of a mold for forming the cylindrical bonded magnet according to the second embodiment. As shown in FIGS. 3 and 8, the internal construction difference between the molding machines according to the first and second embodiments is the positional relationship of the cavity portion and the permanent magnetically-orientating magnets. The end surfaces of the cavity portion are shown by the lines X-X' and Y-Y' in FIGS. 3 and 8, respectively. The positional relationship of the molding cavity and the permanent magnetically-orientating magnets in the mold employed in the second embodiment shown by the line Y-Y' in FIG. 8 is deviated by half the width of a permanent magnetically-orientating magnet relative to the positional relationship shown by the line X-X' in FIG. 3. That is, in the mold employed in the second embodiment, each end surface of the cavity portion is arranged at the midpoint between the N and S poles of the end-side permanent magnetically-orientating magnet.

Figure 6:
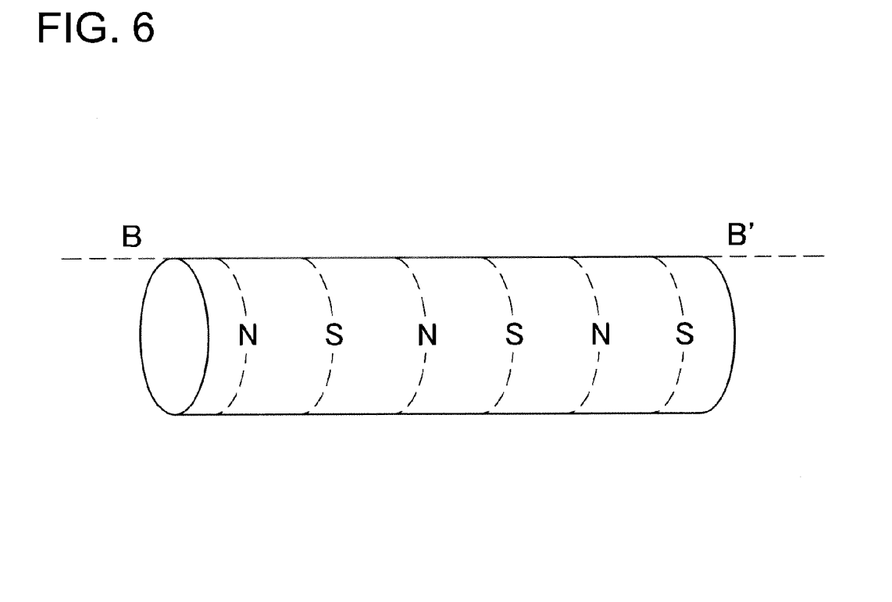
FIG. 6 is a schematic perspective view showing a cylindrical bonded magnet according to another embodiment of the present invention.
Figure 7:
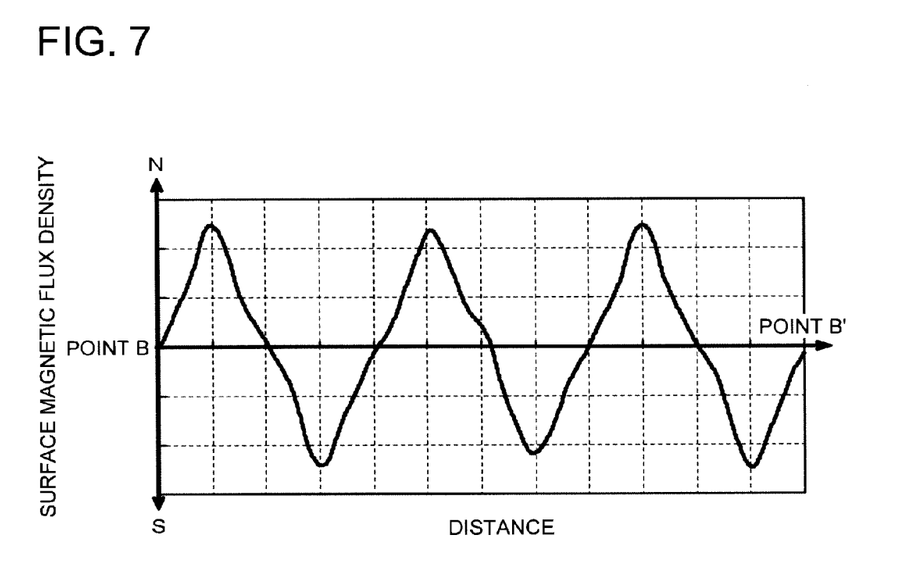
FIG. 7 is a graph showing the magnetic flux density distribution property of the cylindrical bonded magnet shown in FIG. 6 in the axial direction (B-B') as viewed from the side surface.

FIG. 6 is a schematic perspective view showing the cylindrical bonded magnet formed by using the mold shown in FIG. 8. Also, FIG. 7 is a graph showing the magnetic flux density distribution property of the cylindrical bonded magnet shown in FIG. 6 in the axial direction (B-B') as viewed from the side surface. As shown in FIG. 7, the cylindrical surface magnetic flux density distribution has a sinusoidal wave in the case of the bonded magnet produced in the second embodiment as viewed from the side surface. Both the starting point B and the terminal point B' are nodes.

In addition, although the number of the magnetic poles of the cylindrical bonded magnet can be odd or even in the first embodiment, the number of the magnetic poles of the cylindrical bonded magnet is even in the second embodiment.

Figure 9:
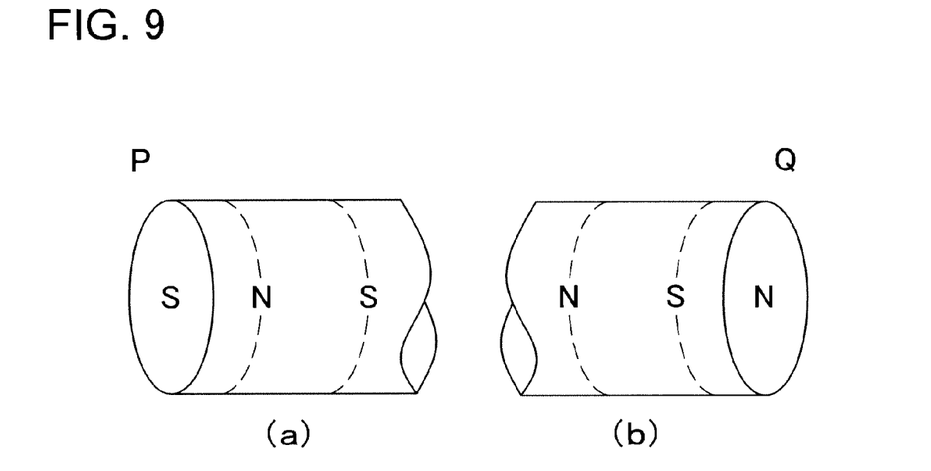
FIG. 9 is an enlarged view showing the both ends of the cylindrical bonded magnet shown in FIG. 6.

FIGS. 9(*a*) and (*b*) are enlarged views showing the both ends of the cylindrical bonded magnet shown in FIG. 6. The surface magnetic flux density is substantially zero at the point P in FIG. 9(*a*). The end surface on the point P side partially has a S pole at its center. As for the opposite end shown in FIG. 9 (*b*), the surface magnetic flux density is substantially zero at the point Q. The reason is that an even-number-th of pole is provided on the side surface of the cylindrical bonded magnet according to the second embodiment. The end surface on the point Q side partially has a N pole at its center.

Figure 10:
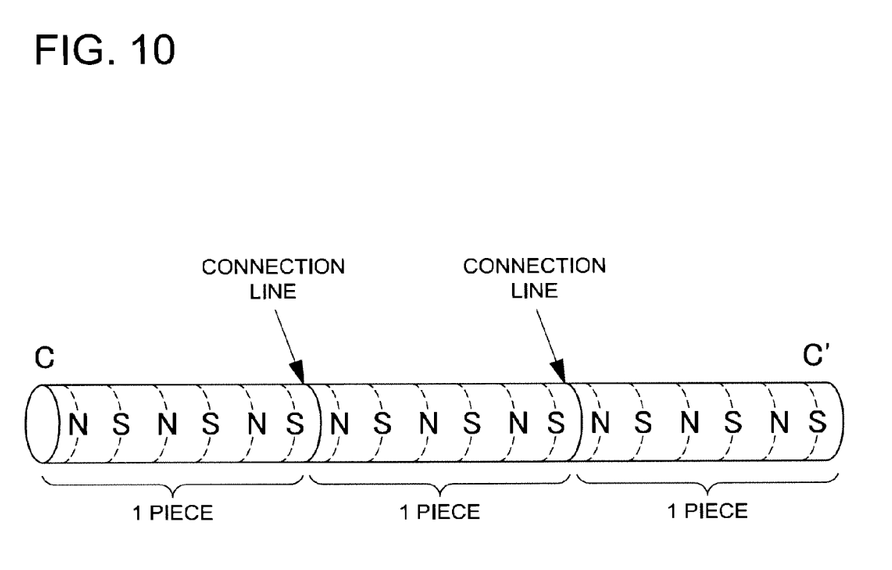
FIG. 10 is a perspective view showing a plurality of connected cylindrical bonded magnets each of which is the cylindrical bonded magnet shown in FIG. 6.

In this cylindrical bonded magnet, although the surface magnetic flux density on the both end surfaces is substantially zero, the center parts of the both end surfaces partially have S and N poles. Accordingly, in the case where the cylindrical bonded magnet shown in FIG. 6 serves as a one magnet piece, when opposite pole end surfaces of a plurality of magnet pieces are brought close to each other, the opposite pole end surfaces can be easily connected to each other by the attractive magnetic force acting between the opposite poles. FIG. 10 is a schematic perspective view showing a rod-shaped magnet device, which includes the cylindrical bonded magnets shown in FIG. 6 as three pieces connected to each other by the magnetic force.

Figure 11:
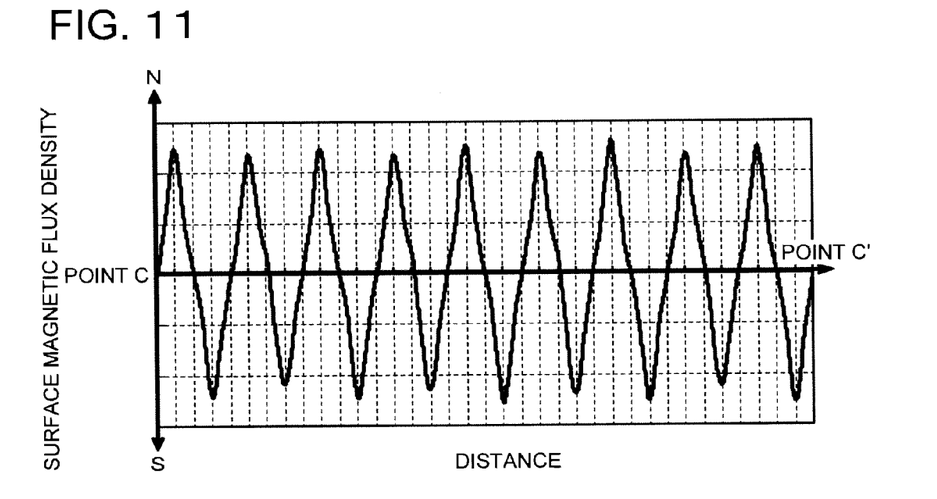
FIG. 11 is a graph showing the magnetic flux density distribution of the plurality of cylindrical bonded magnets shown in FIG. 10 in the axial direction (C-C') as viewed from the side surface.

FIG. 11 shows the surface magnetic flux density distribution when the surface magnetic flux density is measured along a line between the points C and C' as viewed from the side surface of the rod-shaped magnet device shown in FIG. 10. Although the rod-shaped magnet device shown in FIG. 10 has connection parts where a plurality of cylindrical bonded magnets are connected to each other by the attractive magnetic force, the surface magnetic flux density distribution has a continuous sinusoidal wave form over the entire rod-shaped entire magnet device as shown in FIG. 11.

In the first and second embodiments of the present invention, the material of magnets used in the magnetically-orientating magnet device 3 preferably have residual magnetic flux density Br of not less than 1 T. For example, an NdFeB sintered magnet can be used. In the case where magnets with large magnetic force are used in the magnetically-orientating magnet device, strong magnetic force can be generated in the cavity portion so that the cylindrical bonded magnet can have strong magnetic force.

According to the cylindrical bonded magnet formed by the injection molding as discussed above, since easy axes of magnetization the magnetic powder in the bonded magnet can be orientated in desired orientations by the magnetically-orientating magnet device 3, this cylindrical bonded magnet can serve as a magnet. In addition to this, the cylindrical bonded magnet may be further magnetized in a magnetization process if necessary. The magnetization process can increase the magnetic force of the cylindrical bonded magnet.

Anisotropy or isotropic magnetic powder can be employed as the magnetic powder in the first and second embodiments of the present invention. Examples of the anisotropy magnetic powder can be provided by ferrite, $SmCo_5$, Nd—Fe—B, and Sm—Fe—N group materials, and the like. Examples of the isotropic magnetic powder can be provided by Sm—Co and Nd—Fe—B group material, and the like. In the case where a cylindrical bonded magnet is required which has strong magnetic force, anisotropy magnetic powder is preferably employed, and a Sm—Fe—N group material is more preferably employed. The reason is that, when anisotropy magnetic powder is magnetically orientated, the magnetization orientations in anisotropy magnetic powder are easily orientated in desired direction very much by an applied magnetic field, which in turn increases the magnetic force of the cylindrical bonded magnet. The aforementioned magnetic powder materials can be employed solely or in combination of two or more materials as mixture. In addition, the aforementioned magnetic powder materials may subjected to antioxidation treatment or coupling treatment if necessary.

The resin employed in the first and second embodiments of the present invention is not specifically limited. Examples of the resin can be provided by thermoplastic resin such as polypropylene, polyethylene, polyvinyl chloride, polyester, polyamide, polycarbonate, polyphenylene sulfide and acrylic resin, and thermoplastic elastomers such as ester and polyamide group materials. Also, these resin materials can be suitably mixed and employed.

Although the mixture ratio between the magnetic powder and the resin depends on the material type of resin, generally speaking, it is preferable that the ratio of the magnetic powder to the entire cylindrical bonded magnet fall within a range of 45 to 65 vol %. In addition, an antioxidant, a lubricant, and the like can be mixed into the cylindrical bonded magnet.

The forming process is not specifically limited. Examples of the forming process can be provided by extrusion molding, compression molding, and injection molding. The cylindrical bonded magnet is preferably formed by injection molding among the forming process examples in terms of productivity and ease of installation of magnetically orientating equipment.

The following description will described examples according to the present invention. However, the present invention is not limited to these examples.

EXAMPLES

1. Production of Cylindrical Bonded Magnet

Example 1

Preparation of Magnetic Powder

Anisotropy Sm—Fe—N group magnetic powder (mean particle diameter of 3 μm) is employed as the magnetic powder.

(Preparation of Compound)

The aforementioned Sm—Fe—N group magnetic powder is subjected to surface treatment with ethyl silicate and silane coupling agent. The Sm—Fe—N group magnetic powder after surface treatment of 9137 g and the nylon 12 of 863 g are mixed by a mixer. The thus-mixed powder is kneaded at 220° C. by a twin screw kneading extruder, and is then divided into compounds with suitable size after cooled.

(Production of Cylindrical Bonded Magnet)

A cylindrical cavity with inner diameter of 5 mm and length of 70 mm is used as the cavity portion of the injection molding machine. Commercially available NdFeB sintered magnets (Br=1.35 T) with width of 5 mm are used as the magnetically-orientating magnets. The magnets are joined to each other with their same magnetic poles being opposed to each other. Thus, the magnetically-orientating magnet shown in FIG. 5 is produced. The magnetically-orientating magnets are arranged enclosing the cavity portion as shown in FIG. 3. That is, a plurality of sectionally U-shaped small magnets as the permanent magnetically-orientating magnets are arranged with their same magnetic poles being opposed to each other. The opening sides of the U-shaped permanent magnetically-orientating magnets are opposed to each other so that the cavity portion is formed. The temperature of the cylinder of the injection molding machine is set at 230° C. for melting the compound. The interior temperature of the cylinder of the cavity of the injection molding machine is set at 90° C. The cavity portion is filled with the melted compound with the magnetically orientating magnetic field being applied from the magnetically-orientating magnets to the melted compound. The injection pressure of the injection molding machine is set at 100 MPa. The injection speed of the injection molding machine is set at 80 mm/s. The resin in the compound starts hardening and forming the integrally formed member simultaneously with filling the cavity portion. After the material to be integrally formed is held in the cavity portion for eight seconds, the cavity is opened. Subsequently, the thus integrally formed member is pushed out by the ejector pin. As a result, the cylindrical bonded magnet is produced which has diameter of 5 mm, length of 70 mm and orientation pitch of 5 mm.

Example 2

Preparation of Compound

The same compound as the example 1 is employed.
(Production of Cylindrical Bonded Magnet)

A cylindrical cavity of the injection molding machine according to this example is used which has inner diameter of 5 mm and length of 30 mm. Commercially available NdFeB sintered magnets (residual magnetic flux density Br=1.35 T) with width of 5 mm are used as the magnetically-orientating magnets. The magnets are joined to each other with their same magnetic poles being opposed to each other. Thus, the magnetically-orientating magnet shown in FIG. 5 is produced. The magnetically-orientating magnets are arranged to form the cavity portion as shown in FIG. 8. When the cavity portion is formed, the arrangement of the cavity portion is adjusted so that each of the end surfaces of the cavity portion is positioned at the midpoint between the N and S poles of a magnetically-orientating magnet. The temperature of the cylinder of the injection molding machine is set at 230° C. for melting the compound melt. The temperature of the cylinder of the cavity of the injection molding machine is set at 90° C. The cavity portion is filled with the melted compound with the magnetically orientating magnetic field being applied from the magnetically-orientating magnets to the melted compound. The injection pressure of the injection molding machine is set at 100 MPa. The injection speed of the injection molding machine is set at 80 mm/s. The resin in the compound starts hardening and forming the integrally formed body simultaneously with filling the cavity portion. After the material to be integrally formed is held in the cavity portion for eight seconds, the cavity portion is opened. Subsequently, the thus integrally formed member is pushed out by the ejector pin. As a result, the cylindrical bonded magnet is produced which has diameter of 5 mm, length of 30 mm, orientation pitch of 5 mm and six poles.

Comparative Example 1

Production of Bonded Magnet Piece

A cylindrical bonded magnet piece with diameter of 5 mm and height of 5 mm is formed from the compound produced in the example 1 by an injection molding machine. The cylindrical bonded magnet piece is magnetically orientated in the axial direction. The shape of the cavity and the magnetically-orientating magnets are suitably changed. The conditions of the forming process are the same as the example 1 except that a magnetic field of 9 kOe is applied in the thickness direction of cylindrical bonded magnet piece.
(Production of Cylindrical Bonded Magnet)

Fourteen cylindrical bonded magnet pieces are joined to each other by an adhesive with their same poles being opposed to each other. The magnet pieces are held by a holding tool the adhesive hardens. A commercially available epoxy adhesive (Araldite Rapid manufactured by Huntsman Advanced Materials) is employed as the adhesive.

Comparative Example 2

Figure 12:
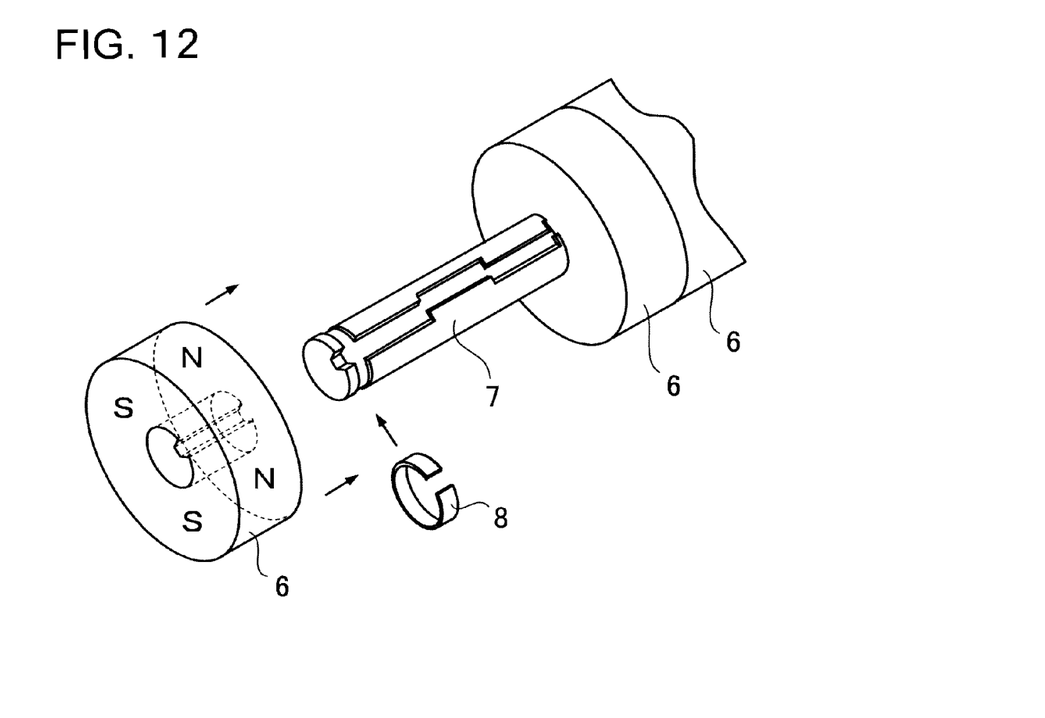
FIG. 12 is a schematic perspective view showing a cylindrical bonded magnet of a comparative example.

FIG. 12 is a schematic perspective view showing a cylindrical bonded magnet produced according to a comparative example 2. The cylindrical bonded magnet is composed of doughnut-shaped bonded magnet pieces 6 with cavities arranged their center, a support shaft 7 to be inserted into the cavities of the doughnut-shaped bonded magnet pieces 6, and fasteners 8 for fastening the doughnut-shaped bonded magnet pieces 6. A protruding portion is formed in a part of the cavity of the doughnut-shaped bonded magnet piece 6. The doughnut-shaped bonded magnet piece 6 can be fastened onto the support shaft 7 by engaging the protruding portion with a groove formed in the support shaft 7. That is, the doughnut-shaped bonded magnet pieces 6 can be arranged in parallel to each other without using an adhesive or the like. In addition, a groove having a shape corresponding to the fastener 8 is formed extending along the circumferential direction in an end part of the support shaft 7. The doughnut-shaped bonded magnet pieces 6 can be completely fastened onto the support shaft 7 by inserting the fastener 8 into this groove.
(Production of Doughnut-Shaped Bonded Magnet Piece 6)

An NC milling machine cuts off the central part of the cylindrical bonded magnet piece produced in the comparative example 1 so that the cavity with diameter of 2.5 mm is formed. But the protruding portion is formed in a part of the cavity.
(Assembling)

As a support shaft 7, a shaft is employed which is formed of SUS304, and has outer diameter of 2.4 mm and length of 75 mm. The protruding portion of the doughnut-shaped bonded magnet piece 6 is slid along the groove of the support shaft 7. Subsequently, the cylindrical bonded magnet pieces 6 are fastened one by one onto the support shaft 7. After fourteen doughnut-shaped bonded magnet pieces 6 are arranged with their same poles being opposed to each other, the fastener 8 completely fastens the fourteen cylindrical bonded magnet pieces 6 onto the support shaft 7.

2. Production of Rod-shaped Magnet Device with Cylindrical Bonded Magnet Pieces Inserted into Pipe Comparative Example 3

Production of Cylindrical Bonded Magnet Piece

The cylindrical bonded magnet piece produced in the comparative example 1 is used as cylindrical bonded magnet pieces in this comparative example.
(Production of Rod-Shaped Magnet Device)

Fourteen cylindrical bonded magnet pieces are inserted into a pipe, which is formed of SUS304, and has length of 90 mm, inner diameter of 5.1 mm and thickness of 0.2 mm, with the same magnetic poles of the cylindrical bonded magnet pieces being opposed to each other. The both ends of the pipe are plugged with plugs, which are formed of SUS304, and have outer diameter of 5 mm and height of 10 mm. Finally, the plugs are fixed onto the both ends of the pipe by welding.

3. Evaluation of Magnetic Property (Measurement of Surface Magnetic Flux Density)

In order to provide the same measurement conditions as the rod-shaped magnet device according to the comparative example 3, which includes the cylindrical bonded magnet pieces inserted into the pipe, the cylindrical bonded magnets produced in the example 1, and the comparative examples 1 and 2 are inserted into a pipe, which is formed of SUS304, and has length of 90 mm, inner diameter of 5.1 mm and thickness of 0.2 mm. Three cylindrical bonded magnets produced in the example 2 are prepared and inserted into a pipe, which is formed of SUS304, and has length of 90 mm, inner diameter of 5.1 mm and thickness of 0.2 mm, with their N and S magnetic poles being opposed to each other. A gauss meter is in contact with the side surface of each pipe so that the maximum value of the surface magnetic flux density is measured. Table 1 shows the results.

4. Evaluation of Productivity

Table 1 shows the number of the formed members required to produce ten cylindrical bonded magnets or rod-shaped magnet devices, and the time taken for forming the required formed members by injection molding. The time taken for injection molding formation refers to the time from the start of formation of the first formed member to the end of formation of the required-number-th formed member. It is noted that the time values in the example 2 and the comparative examples 1 to 3 shown in Table 1 are the time taken for assembling ten cylindrical bonded magnets or rod-shaped magnet devices. In the example 1, assembling time is not required. The assembling time in the example 2 is 3 minutes for assembling ten cylindrical bonded magnets. This assembling time value is much shorter than the comparative examples. The reason is that magnets do not repel each other when being inserted into the pipe in the example 2. In addition, Table 1 shows the yields in the case where one hundred cylindrical bonded magnets or the rod-shaped magnet devices are produced.

used in the comparative example 2, the magnetic property in the comparative example 2 is low.

Although the rod-shaped magnet device in the example 2 has connection parts, its surface magnetic flux density distribution has a sinusoidal wave form.

As discussed above, according to the present invention, it is possible to provide a cylindrical bonded magnet with high magnetic property capable of being produced with high productivity.

INDUSTRIAL APPLICABILITY

A cylindrical bonded magnet according to the present invention can be used as a permanent magnet for foreign matter removal device or linear motor.

| EXPLANATION OF REFERENCE LETTERS OR NUMERALS | |
|---|---|
| 1 | Cavity Portion |
| 2 | Side Wall |
| 3 | Magnetically-Orientating Magnet Device |
| 4 | Ejector Pin |
| 5, 5' | Magnet Member of Joined Magnetically-Orientating Magnets |
| 6 | Doughnut-Shaped Bonded Magnet |
| 7 | Support Shaft |
| 8 | Fastener |

TABLE 1

| | Assembling | Number of formed members required for producing ten devices (pieces) | Time for forming the req. num. of members (min.) | Assembling time (min. per ten devices) | Yield (%) | Surface magnetic flux density (mT) |
|---|---|---|---|---|---|---|
| Ex. 1 | — | 10 | 2 | — | 100 | 157 |
| Ex. 2 | — | 30 | 6 | 3 | 100 | 159 |
| Comp. Ex. 1 | Adhesion | 140 | 24 | 182 | 71 | 155 |
| Comp. Ex. 2 | Engagement | 140 | 24 | 77 | 100 | 141 |
| Comp. Ex. 3 | Welding | 140 | 24 | 102 | 83 | 153 |

Since a single molding process can produce one cylindrical bonded magnet in the example 1, the time taken for injection molding is short. Contrary to this, in the comparative examples 1 to 3, since it is necessary to produce a number of cylindrical bonded magnet pieces, the time taken for injection molding is long. In the comparative examples 1 to 3, the time is additionally required which is taken for joining cylindrical bonded magnet pieces to each other to assemble the cylindrical bonded magnet or rod-shaped magnet device. Although not shown in Table 1, in the comparative example 2, the time is required which is taken for machining the cylindrical bonded magnet piece into a doughnut shape and for producing the fastener. From this point, it can be found that the cylindrical bond magnet according to the present invention can be produced with high productivity. The yields in the comparative examples 1 and 3 will decrease due to poor joining or welding. Contrary to this, since joining and welding processes are not required in the present invention, cylindrical bonded magnets with high quality can be safely produced with high productivity.

The magnets according to the examples 1 and 2 are substantially equal in magnetic property to the comparative examples 1 and 3. Since doughnut-shaped magnet pieces are

The invention claimed is:

1. A cylindrical bonded magnet that has a substantially cylindrical exterior shape, the cylindrical bonded magnet comprising:
   an integrally formed member comprising a compound of magnetic powder and resin,
   wherein said compound of said integrally formed member extends continuously from an imaginary line forming a longitudinal center axis of the integrally formed member to an outer surface of the integrally formed member and continuously from a first longitudinal end of the integrally formed member to a second, opposing longitudinal end of the integrally formed member,
   wherein said integrally formed member is magnetized so as to include a plurality of N and S poles that are alternately disposed in a continuous, uninterrupted manner along a length of the integrally formed member,
   wherein a total number of the N poles and S poles in said integrally formed member is even, and
   wherein a surface magnetic flux density distribution along a longitudinal direction of said cylindrical bonded magnet has a form of a substantially sinusoidal wave with ends of the sinusoidal wave corresponding to nodes, when the surface magnetic flux of said cylindrical bonded magnet is measured as viewed from a side of said cylindrical bonded magnet.

2. The cylindrical bonded magnet according to claim 1, wherein the integrally formed member of said cylindrical bonded magnet is formed by injection molding.

3. The cylindrical bonded magnet according to claim 1, wherein said magnetic powder comprises an anisotropic alloy powder of rare earth-iron-nitrogen group material.

4. A method for producing a cylindrical bonded magnet according to claim 1, the method comprising:
preparing the compound of the magnetic powder and the resin by kneading the magnetic powder and the resin;
charging the compound into a cavity portion;
hardening said compound into an integrally formed member so that the compound extends continuously from a longitudinal center axis of the integrally formed member to an outer surface of the integrally formed member and continuously from a first longitudinal end of the integrally formed member to a second, opposing longitudinal end of the integrally formed member; and
applying an orientated magnetic field to said compound such that the integrally formed member is formed to include a plurality of N and S poles that are alternately disposed in a continuous, uninterrupted manner along a length of the cylindrical bonded magnet.

5. The method for producing a cylindrical bonded magnet according to claim 4,
wherein, in the step of charging the compound into the cavity portion, the cavity portion is formed by a magnetically-orientating magnet device that comprises a first magnet member and a second magnet member, each of the first magnet member and the second magnet member including a plurality of magnets that are combined with their same poles being opposed to each other respectively, and the first magnet member and the second magnet member being arranged to be assembled in a way that each of the same poles of the first magnet member and the second magnet member are faced to form the cavity portion in the magnetically-orientating magnet device.

6. The cylindrical bonded magnet according to claim 1, wherein the surface magnetic flux density on the end surfaces of the cylindrical bonded magnet is substantially zero, and the center parts of the both end surfaces partially have opposite poles.

7. The cylindrical bonded magnet according to claim 1, wherein the surface magnetic flux density on the end surfaces of the cylindrical bonded magnet is formed such that, when an edge of the cylindrical bonded magnet is connected to a second, similar cylindrical bonded magnet, the surface magnetic flux density distribution of the combined structure has a continuous sinusoidal wave form.

8. A rod-shaped magnet device comprising:
at least two cylindrical bonded magnets, each of the at least two cylindrical bonded magnets having a substantially cylindrical exterior shape and comprising:
an integrally formed member comprising a compound of magnetic powder and resin,
wherein said compound of said integrally formed member extends continuously from an imaginary line forming a longitudinal center axis of the integrally formed member to an outer surface of the integrally formed member and continuously from a first longitudinal end of the integrally formed member to a second, opposing longitudinal end of the integrally formed member,
wherein said integrally formed member is magnetized so as to include a plurality of N and S poles that are alternately disposed in a continuous, uninterrupted manner along a length of the integrally formed member,
wherein a total number of the N poles and S poles in said integrally formed member is even, and
wherein a surface magnetic flux density distribution along a longitudinal direction of said cylindrical bonded magnet has a form of a substantially sinusoidal wave with ends of the sinusoidal wave corresponding to nodes, when the surface magnetic flux of said cylindrical bonded magnet is measured as viewed from a side of said cylindrical bonded magnet; and
a nonmagnetic pipe that accommodates said at least two cylindrical bonded magnets,
wherein a surface magnetic flux density distribution of said at least two cylindrical bonded magnets along a longitudinal direction of said at least two cylindrical bonded magnets has a form of a continuous substantially sinusoidal wave, when the surface magnetic flux of said at least two cylindrical bonded magnets is measured as viewed from a side of said nonmagnetic pipe.

* * * * *